United States Patent [19]
Lintner

[11] Patent Number: 6,135,313
[45] Date of Patent: *Oct. 24, 2000

[54] DEVICE FOR STORING AND ISOLATING COMPONENTS WHICH CAN BE ACCOMODATED AS BULK MATERIAL

[75] Inventor: Albert Lintner, Miesbach, Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/043,845
[22] PCT Filed: Sep. 20, 1996
[86] PCT No.: PCT/DE96/01790
  § 371 Date: Mar. 27, 1998
  § 102(e) Date: Mar. 27, 1998
[87] PCT Pub. No.: WO97/11900
  PCT Pub. Date: Apr. 3, 1997

[30] Foreign Application Priority Data

Sep. 27, 1995 [DE] Germany .......................... 195 35 956

[51] Int. Cl.[7] .................................................. B65G 59/00
[52] U.S. Cl. ........................................... 221/175; 221/183

[58] Field of Search ...................................... 221/156, 183, 221/278, 175, 68

[56] References Cited

U.S. PATENT DOCUMENTS 2,419,050  4/1947  Ashwood ............................... 221/183

FOREIGN PATENT DOCUMENTS 156423  4/1903  Germany .
1025239  2/1958  Germany .

*Primary Examiner*—Kenneth W. Noland
*Attorney, Agent, or Firm*—Hill & Simpson

[57] ABSTRACT

An apparatus for storing and isolating components that are accommodated as bulk material has a supply reservoir for receiving the bulk material. An orientation canal is connected to the supply reservoir through which the parts are transported succesively and in a proper orientation. A reliable and non-damaging isolation of the parts is achieved by an exit region of the supply reservoir. The exit region includes an inlet funnel for the orientation canal. The inlet funnel has two funnel walls that are oriented parallel to one another and that lie in one plane with bordering walls of the orientation canal. The apparatus of the invention is particularly suited for the isolation and provision of electronic components.

4 Claims, 2 Drawing Sheets

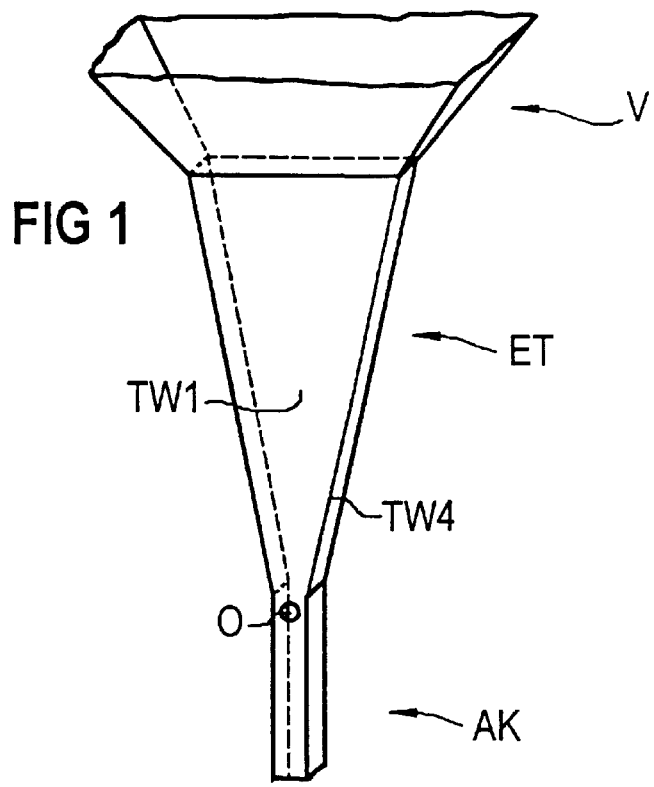
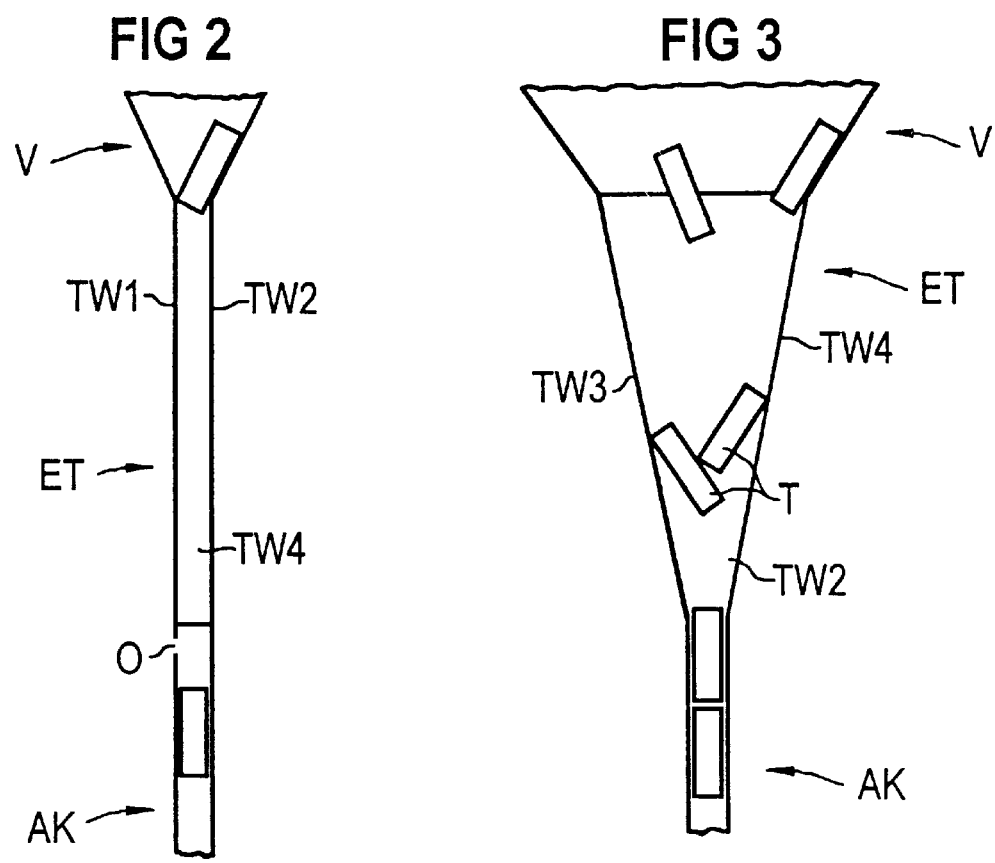

DEVICE FOR STORING AND ISOLATING COMPONENTS WHICH CAN BE ACCOMODATED AS BULK MATERIAL

BACKGROUND OF THE INVENTION

The invention relates to an apparatus for storing and isolating parts that can be accepted as bulk material.

In particular, the device may accommodate cubical or cylindrical electronic components as the bulk material.

For the automatic equipping of circuit boards or ceramic substrates with SMD components, such as resistors, capacitors, diodes, transistors and the like, automatic placement machines are used that operate, for example, according to what is called pick-and-place design. The supplying of the components is thereby determined by their state when delivered. Thus, for example, corresponding supply modules are provided for bulk material, for magazines, and for belts. A placement head, flange-mounted on a freely programmable positioning unit, moves over these supply modules and over the circuit board centered in stationary fashion in the placement region, or over a ceramic substrate centered in stationary fashion in the placement region. The placement head accepts the components at the removal positions of the supply modules with the aid of a suction pipette, whereupon the respectively accepted component rotates into the assembly position, and is set into the provided placement position on the circuit board or on the ceramic substrate. Subsequently, the substrates equipped in this way are sent on for reflow soldering, whereby the surface mounting of the components is terminated, in particular by means of vapor-phase soldering.

For provision of the components as bulk material, which is particularly economical, apparatuses are used that comprise a supply reservoir for accepting or receiving the bulk material and an orientation canal connected to an exit of the supply reservoir. The cross-section of the orientation canal corresponds to the cross-section of the components, but which is slightly oversized. The entry cross-section of the orientation canal is thus matched to the shape and size of the components in such a way that the components can enter only in the correct position, and only one after the other, and be transported to a removal position. The transport of the components to the removal position can be carried out for example by means of the construction of the transport path as a gravity conveyor, a vibration conveyor or a blown-air conveyor. In the entry region of the orientation canal, a jam of improperly positioned components can occur that can be initiated by a single component blocking the entry cross-section of the orientation canal. The jam can however also be triggered by a bridge formation of two or more parts that become jammed between the walls in the exit region of the supply reservoir.

European Patent Document No. EP-B-0 216 203 discloses that it is known to resolve a jam in the entry region of the orientation canal in an apparatus of the type named above by introducing a gas, so that correctly positioned parts can move up and can enter into the orientation canal.

German Patent Document Nos. DE-C-39 42 996 and DE-A-37 17 918, both disclose that, it is known to shape the entry region of the orientation canal with a cross-section that, beyond its planar floor surface, is limited by a wall surface that runs neither parallel to the floor surface nor at a right angle thereto. By means of this cross-sectional shape, contact between flat surfaces of the components with the wall surfaces, and thus also bridge formations of the components, are supposed to be avoided.

In the known apparatuses for storing and isolating parts that can be accepted as bulk material, the isolation of the components by means of correctly positioned entry into the orientation canal rests on chance. However, this typically results in undesirably long durations for components to pass the region between the orientation canal entry position and the component removal position. On the other hand, the introduction of a gas for the removal of jams or bridge formations can cause damage to the components, due to the high gas pressure required in the turbulence chamber.

SUMMARY OF THE INVENTION

One object of the present invention is to provide an apparatus for storing and isolating parts that are accommodated as bulk material, in which a reliable and non-damaging isolation of the parts is ensured.

This object is achieved by the apparatus of the present invention in that the exit region of the supply reservoir forms an inlet funnel for the orientation canal. The inlet funnel has two funnel walls that are oriented parallel to one another and that lie in a plane with the bordering walls of the orientation canal.

The invention is based on the finding that a funnel-shaped construction of the exit region of the supply reservoir is very advantageous for the isolation of the parts, given the presence of a particular funnel geometry. The funnel-shaped exit region of the supply reservoir thereby forms an inlet funnel for the orientation canal. The funnel shaped exit region has two funnel walls that are oriented parallel to one another and that transition smoothly into the orientation canal. The distance between the two parallel funnel walls is hereby matched to the cross-section section of the parts to be isolated, though slightly oversized, so that the parts are pre-oriented vertically in the funnel region. Since the parts can no longer line up in the funnel region, they move to the orientation canal while maintaining their pre-oriented position, and can then successively enter the orientation canal without difficulty.

In an embodiment, an opening is provided in the inlet region of the orientation canal through which a gas may be introduced to remove parts jammed or caught within the canal. This enables a non-damaging elimination of a jam within the canal that may occur before the components enter the orientation canal.

In an embodiment, the inlet funnel is oriented vertically. This embodiment facilitates the easy supply of parts of components into the canal.

In an embodiment, the inlet region of the orientation canal runs in the vertical direction. This enables transportation of the components downward through the canal by gravitational force.

These and other objects, features and advantages of the present invention are described herein, and will be apparent from the detailed description of the presently preferred embodiments and related drawing figures.

BRIEF DESCRIPTION OF THE DRAWING FIGURES

An exemplary embodiment of the invention is shown in the drawing, figures and is described in more detail in the following.

FIG. 1 shows a perspective view of the transition region between the supply reservoir and the orientation canal in an apparatus for storing and isolating parts that can be accepted as bulk material, FIG. 2 shows a first longitudinal section through the transition region according to FIG. 1, FIG. 3 shows a second longitudinal section through the transition region according to FIG. 1, FIG. 4 shows a perspective view of an apparatus for storing and isolating parts that can be accepted as bulk material, and FIG. 5 shows the part of the apparatus shown in FIG. 4 that contains the transition region between the supply reservoir and the orientation canal, shown schematically in FIGS. 1 to 3.

DETAILED DESCRIPTION OF THE PRESENTLY PREFERRED EMBODIMENT

FIGS. 1 to 3 show a highly simplified schematic representation of the geometry of an inlet funnel designated ET that extends between the lower end of a supply reservoir V and an exit canal AK. The supply reservoir V, which accepts or receives parts T in the form of bulk material, is constructed in the shape of a funnel in its lower region. The inlet funnel ET, which borders immediately on the four walls (inclined in the shape of a funnel) of the supply reservoir V, comprises two trapezoidal funnel walls TW1 and TW2 that are oriented parallel to one another, and two inclined rectangular funnel walls TW3 and TW4. The inside width of the two funnel walls TW1 and TW2 oriented parallel to one another corresponds to the inner width of the orientation canal AK, which has a square cross-section. The two funnel walls TW1 and TW2 thereby lie in one plane with the bordering walls of the orientation canal AK, providing a smooth transition without a step and without a bend. The cross-section of the orientation canal AK corresponds to the cross-section of the parts T to be isolated, except that it is slightly oversized. Thus the parts T can enter into the inlet funnel ET only in a vertically pre-oriented position. Correspondingly, the transition into the orientation canal AK can then also proceed without greater changes of position of the parts T. In the inlet region of the orientation canal AK, an opening O is provided in which a gas, preferably air, can be introduced in order to remove a possible jam of the parts T. In the isolation of electronic components, pulsed air is introduced through the opening O with pulse times of, for example 60 miliseconds. The air pressure is thereby low enough that damage to the components can be excluded with certainty.

The isolation process can be seen in particular in FIGS. 2 and 3. The parts T, accepted in the supply reservoir V in the form of bulk material, move through the funnel-shaped taper into the inlet funnel ET, whose inclined funnel walls TW3 and TW4 lead to the entry of the orientation canal AK. The parts T are thereby already vertically pre-oriented by the two parallel funnel walls TW1 and TW2. Since both the inlet funnel ET and the entry region of the orientation canal AK are oriented vertically, the parts T move successively and in the correct position into the orientation canal AK, due to the action of gravity.

Figure 4:
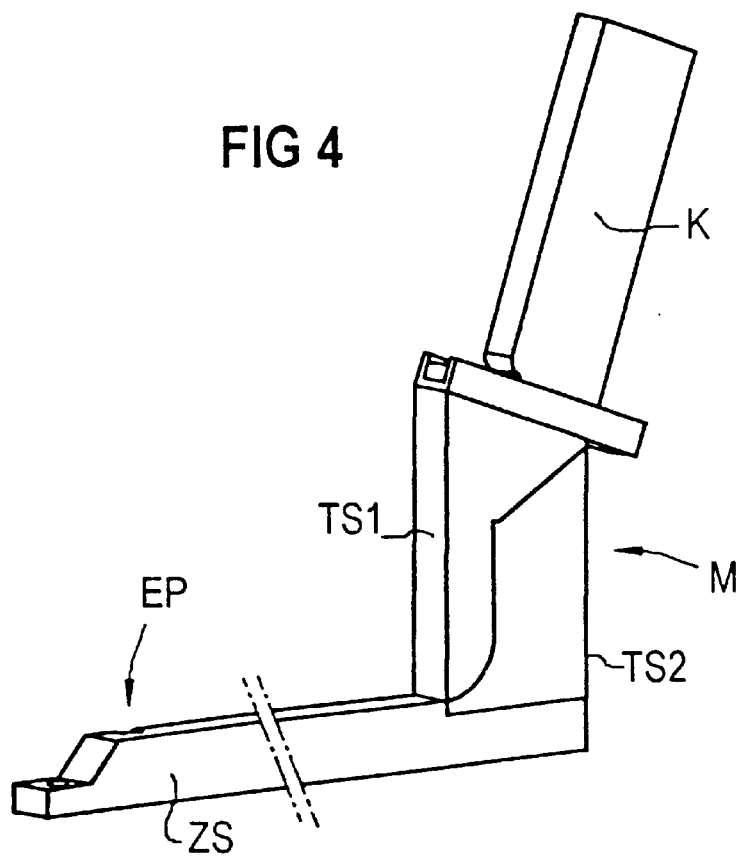
Figure 5:
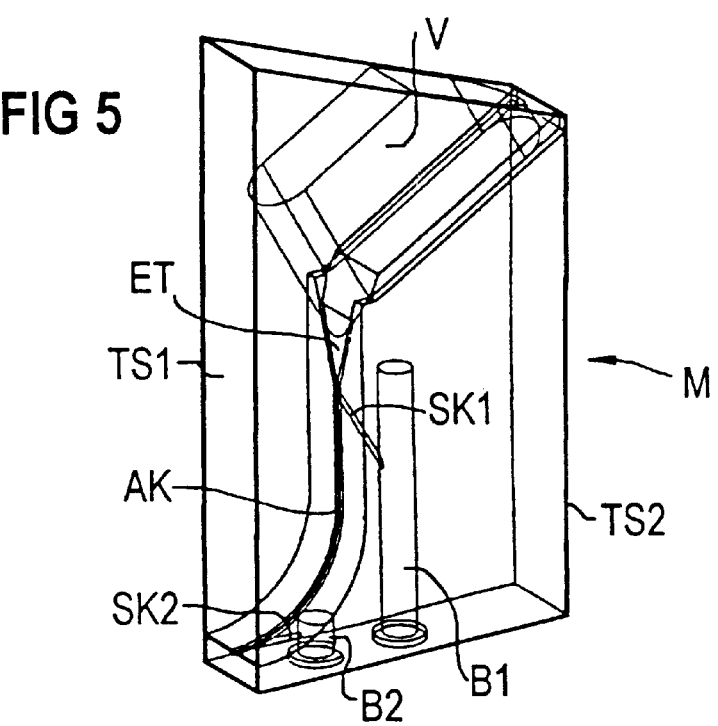

FIG. 4 shows a perspective view of an apparatus for storing and isolating parts that can be accepted as bulk material, in which the isolation of the parts takes place according to the principle shown in FIGS. 1 to 3. FIG. 5 shows, in detail, a module M of the apparatus shown in FIG. 4. The module is assembled from two subpieces TS1 and TS2 and contains the actual isolation region.

The parts T to be isolated are supplied in a cartridge K, which is mounted on the apparatus in such a way that its outlet faces the supply reservoir V. When the seal of the cartridge K is opened, the parts T thus move into the supply reservoir V, which is shown in FIG. 5 as a hollow space in the subpiece TS1, which is made of a transparent material. The inlet funnel ET, connected to the supply reservoir V and the orientation canal AK connected to the inlet funnel ET are made in the subpiece TS2 as a milled-out out part, whereby the fourth wall is respectively formed by the immediately bordering subpiece TS1. The orientation canal AK runs first in the vertical direction and then pivots around in the shape of a bend into the horizontal direction.

A first vertical bore B1 is made in the subpiece TS2, which leads via a branch canal SK1 to the opening O, which is specified in connection with FIGS. 1 and 2. Via the bore B1, pulsed air is thus introduced, which resolves jams that may occur in the region of the inlet funnel ET.

In addition, a second vertical bore B2 is made in the subpiece TS2, which second bore emerges into the orientation canal AK via a second branch canal SK2. Air is introduced via the bore B2, which serves to transport the parts T in the horizontal region of the orientation canal AK. This horizontal region of the orientation canal AK runs in a guide rail ZS, shown in FIG. 1. In the front region of this guide rail ZS, a removal position EP for the parts T is located at the end of the orientation canal AK (not shown in more detail here). At this removal position EP, the isolated parts can be successively accepted by the suction pipette of a placement head, and can be set in the provided placement position on a circuit board to be equipped.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. An apparatus for storing and isolating parts that are accommodated as bulk material, in particular cubical or cylindrical electronic components, the apparatus comprising:

a supply reservoir for accepting the bulk material, the supply reservoir having an exit;

an orientation canal connected to the exit of the supply reservoir, the parts being transported successively and in a correct position through the orientation canal; and an inlet funnel formed at the exit of the supply reservoir and the orientation canal, the inlet funnel being formed with a smooth transition into the exit region without any step transition, the inlet funnel having two stationary, fixed funnel walls oriented parallel to one another that lie in one plane with bordering walls of the orientation canal, a distance between the funnel walls being related to a thickness of the parts.

2. An apparatus according to claim 1, further comprising:

an opening in the inlet region of the orientation canal through which a gas can be introduced for removing a jam of the parts.

3. An apparatus according to claim 1, wherein the inlet funnel is oriented vertically.

4. An apparatus according to claim 1, wherein the inlet region of the orientation canal runs in a vertical direction.

* * * * *